UNITED STATES PATENT OFFICE.

WARREN F. BLEECKER, OF BOULDER, COLORADO, ASSIGNOR TO THE TUNGSTEN PRODUCTS COMPANY, OF BOULDER, COLORADO, A CORPORATION OF COLORADO.

PROCESS FOR THE EXTRACTION OF VANADIUM, URANIUM, AND RADIUM FROM CERTAIN ORES.

1,399,246.    Specification of Letters Patent.    Patented Dec. 6, 1921.

No Drawing. Original application filed October 2, 1919, Serial No. 327,955. Divided and this application filed June 9, 1920. Serial No. 387,671.

*To all whom it may concern:*

Be it known that I, WARREN F. BLEECKER, a citizen of the United States, residing at Boulder, in the county of Boulder and State of Colorado, have invented certain new and useful Improvements in Processes for the Extraction of Vanadium, Uranium, and Radium from Certain Ores, of which the following is a specification.

This invention relates to a process of extracting vanadium, uranium and radium from certain ores and more particularly to the process shown and described in my application for Patent Serial No. 327,955, filed October 2, 1919, of which the present application is divisional.

The process as disclosed consists briefly in mixing the ore in a finely divided condition with an alkali metal carbonate and sufficient water to form a paste which is digested by the application of heat under pressure.

The product of the digestive action is filtered to separate the alkaline liquor carrying in solution the uranium and a part of the vanadium values which were present in the ore. and the residue is treated with an acid to dissolve the radium.

The acid solution carrying the radium and usually a small quantity of vanadium, is separated from the residue by filtration and the radium and vanadium are recovered therefrom by precipitation.

The residue of the filtration is subjected to a separate treatment to recover its vanadium values and it is to this particular branch of the process that the present application appertains.

The process is particularly adapted for the treatment of carnotite ores, but is applicable to other uranium, radium or vanadium carrying ores without material changes.

After the ore has been ground to a suitable fineness (a size of approximately twenty mesh being well adapted for the purpose) it is mixed with an alkali-metal carbonate and sufficient water to form a paste. Sodium carbonate is most suitable and may be used in quantities up to about 50% of the amount of ore under treatment.

The diluted ore is digested by heating it under pressure in an autoclav or other suitable vessel until part of the vanadium and practically all the uranium contents of the ore have gone into solution and the barium radium compounds are completely decomposed.

In order to produce the high temperature (about 150° C.) necessary to promote the conductive reactions and to produce other reactions which do not take place at lower temperatures, I use live steam which is circulated through the material while being under pressure of approximately ninety pounds per square inch.

After the digestive action has been allowed to continue for a period of about one hour, the alkaline liquor carrying the uranium and a part of the vanadium in solution together with soluble sulfates resulting from the decomposition of the sulfates present, such as barium sulfate and calcium sulfate, is separated from the ore by filtration and the uranium and vanadium values are recovered therefrom by evaporation or other suitable methods.

The residue of the filtration containing the barium radium compounds in an acid soluble condition, is treated with an acid of about 16° Baumé in a quantity of about 25% of the amount of dried residue under treatment.

Hydrochloric acid or any other acid which will not form insoluble radium compounds, may be used for this purpose.

The radium and vanadium carrying solution is separated by filtration and the values are subsequently removed therefrom by precipitation.

The residue of the filtration is triturated in order to liberate the slimed mineral matter which constitutes the cementing agent by which the values were carried and which at this point of the process contains vanadium values only.

The vanadium carrying matter is removed by decantation and the vanadium is separated therefrom by any suitable method.

The grinding and digesting actions of the first part of the process produce a certain amount of abrasion which in many ores is sufficient to free the cementing matter to the extent that subsequent trituration is unnecessary.

It is obvious that in such cases the residue obtained by filtration of the acidified residue of the filtered product of the digestive action may be immediately subjected to decantation and that in general, trituration may be eliminated from the process if a slightly lower percentage of vanadium extraction is accepted.

The acid added to the residue of the filtered product of the digesting action may be either hot or cold and it will be understood that although the use of acid of the above-mentioned specific gravity is preferred, acid of any other strength will effect the solution of the radium, provided that the quantity used is sufficient to acidify the mixture.

Having thus described my invention what I claim and desire to secure by Letters-Patent is:

1. The process of extracting values from vanadium ores consisting in mixing the ore with an alkali-metal carbonate and water, heating the mixture under pressure to a high temperature, separating the alkaline liquor from the product, treating the residue with an acid, separating the acid liquor by filtration, triturating the residue to free slimes of mineral matter carrying vanadium values, and removing the vanadium-carrying slime.

2. The process of extracting values from vanadium ores consisting in mixing the ore with an alkali-metal carbonate and water, heating the mixture under pressure to a high temperature, separating the alkaline liquor from the product, treating the residue with an acid, separating the acid liquor by filtration, triturating the residue to free slimes of mineral matter carrying vanadium values, and removing the vanadium-carrying slime by decantation.

3. The process of extracting values from vanadium ores consisting in mixing the ore with an alkali-metal carbonate and water, heating the mixture under pressure to a high temperature, separating the alkaline liquor from the product, treating the residue with an acid, separating the acid liquor by filtration, and removing vanadium carrying slimes from the residue.

4. The process of extracting values from vanadium ores consisting in mixing the ore with an alkali-metal carbonate and water, heating the mixture under pressure to a high temperature, separating the alkaline liquor from the product, treating the residue with an acid, separating the acid liquor by filtration and removing vanadium carrying slimes from the residue by decantation.

In testimony whereof I have affixed my signature.

WARREN F. BLEECKER.